United States Patent [19]

Nourrcier, Jr.

[11] Patent Number: 5,347,357
[45] Date of Patent: Sep. 13, 1994

[54] HIGH-VOLTAGE CRYSTAL RAMP GENERATOR AND INTEGRATOR FOR FM LASER RADAR

[75] Inventor: Charles E. Nourrcier, Jr., Lakewood, Calif.

[73] Assignee: Hughes Aircraft Company, Los Angeles, Calif.

[21] Appl. No.: 10,124

[22] Filed: Jan. 28, 1993

[51] Int. Cl.5 .................... G01C 3/08; G02B 26/00; G02F 1/23
[52] U.S. Cl. .................... 356/5; 356/28.5; 359/239; 359/278
[58] Field of Search .............. 359/239, 278; 356/5, 356/28.5

[56] References Cited

U.S. PATENT DOCUMENTS

| | | | |
|---|---|---|---|
| 4,666,295 | 5/1987 | Duvall, III et al. | 356/5 |
| 4,846,571 | 7/1989 | Jelalian et al. | 356/5 |
| 5,077,619 | 12/1991 | Toms | 359/187 |
| 5,111,468 | 5/1992 | Kozlousky et al. | 359/328 |
| 5,173,749 | 12/1992 | Tell et al. | 356/437 |
| 5,245,461 | 9/1993 | Fitzmartin | 359/195 |

*Primary Examiner*—Stephen C. Buczinski
*Attorney, Agent, or Firm*—Michael W. Sales; Wanda K. Denson-Low

[57] ABSTRACT

A power beam tube is biased to supply a constant current to an EO crystal used as part of a frequency modulation circuit for FM laser radar. Integration of the constant current by the EO crystal's capacitance generates the desired ramp voltage waveform. A correction current is easily added to the circuit. The circuit effectively removes the EO crystal driver circuitry from the control loop, increasing the speed of the frequency modulator loop about ten times.

13 Claims, 1 Drawing Sheet

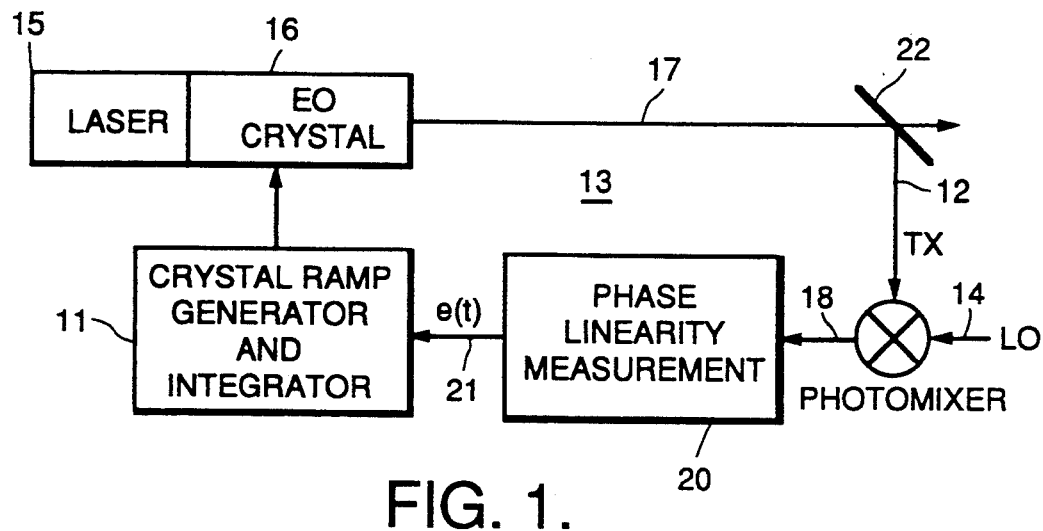
FIG. 1.
FIG. 2.
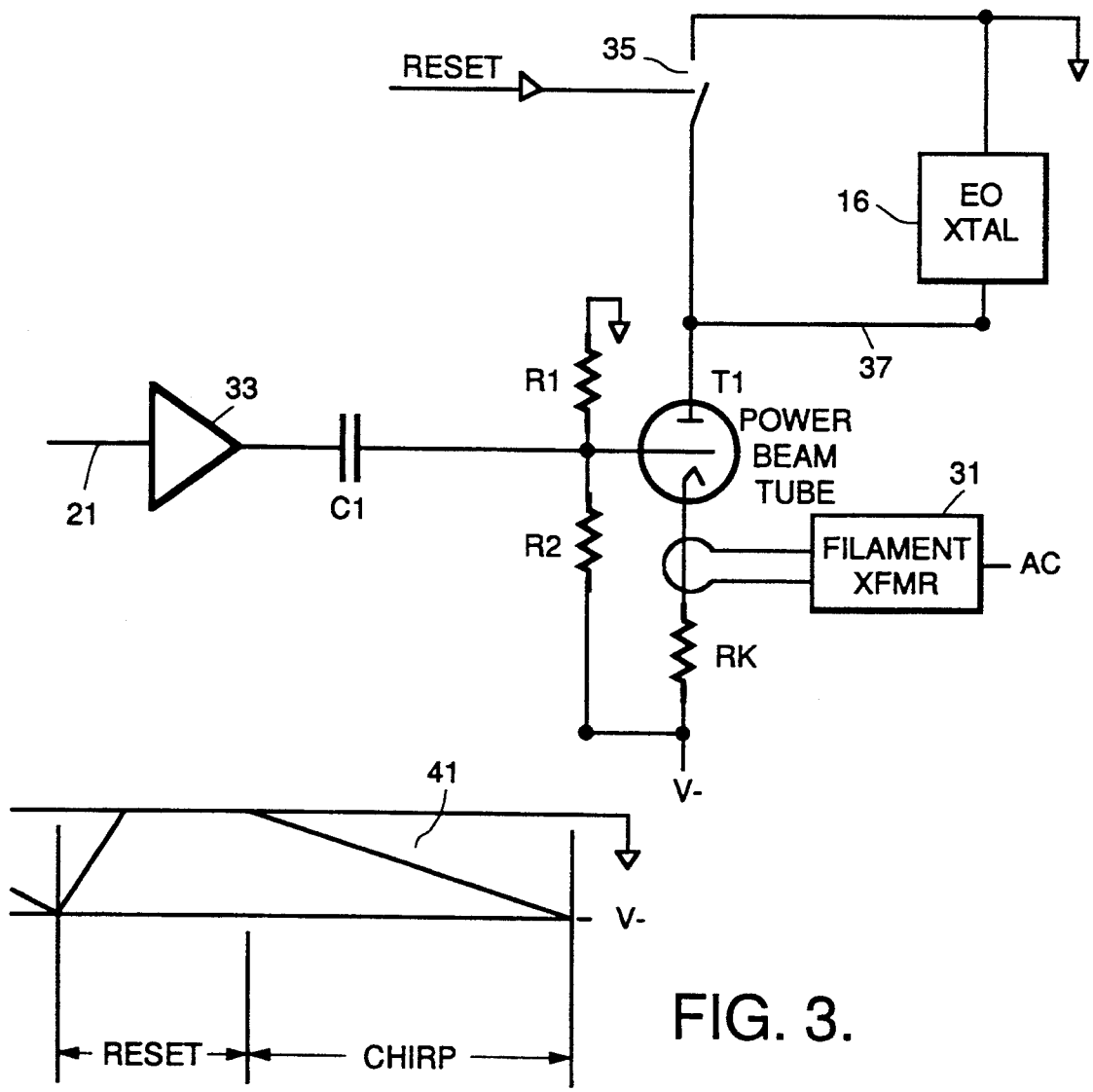
FIG. 3.

HIGH-VOLTAGE CRYSTAL RAMP GENERATOR AND INTEGRATOR FOR FM LASER RADAR

BACKGROUND OF THE INVENTION

1. Field of the Invention

The present invention relates generally to FM laser radar and, more particularly, to an elegantly simple, high-voltage, electro-optic "EO" crystal driver for use in such radars.

2. Description of Related Art

Laser radar systems, employing an intensely focused beam of light to detect the presence, position, and motion of objects, have been used in many applications, especially in the radar, communications, and measurement fields. Militarily, these systems have been implemented in conjunction with new cruise missile and tactical fighter technology wherein laser radar has provided obstacle avoidance, as well as terrain following functions. Laser radar systems have also enabled sophisticated target homing capabilities for accurately guiding a missile or plane toward a target by using a distinguishing feature of that target.

Pulse compression is used advantageously in radar systems, including laser radar or "lidar" systems which operate at optical rather than radio frequencies. A lidar system employing linear FM pulse compression is disclosed in U.S. Pat. No. 4,666,295, entitled "LINEAR FM CHIRP LASER," issued May 19, 1987 to R. Duvall et al.

Pulse compression involves the transmission of a long coded pulse and the processing of the received echo to obtain a relatively narrow pulse. The increased detection capability of a long-pulse radar system is achieved while retaining the range resolution capability of a narrow-pulse system. Transmission of long pulses permits a more efficient use of the average power capability of the radar without generating high peak power signals. The average power of the radar may be increased without increasing the pulse repetition frequency (PRF) and thereby decreasing the unambiguous range of the radar.

In pulse compression radar, a long pulse is generated from a narrow pulse which contains a large number of frequency components with a precise phase relationship between them. The relative phases are changed by a phase-distorting filter such that the frequency components combine to produce a stretched, or expanded pulse which is then amplified and transmitted. In some classes of radar where the transmitted signal frequency is much greater than practical phase-distorting filters such as surface acoustic wave (SAW) devices can accommodate, the transmitter must be frequency modulated directly in order to produce an expanded pulse. This is the case for laser radar. The received echo is processed in the receiver by a compression filter, which readjusts the relative phases of the frequency components so that a narrow or compressed pulse is again produced.

Various pulse compression methods are known in the art, including linear frequency modulation (FM), non-linear FM, and phase-coding. Linear FM pulse compression, also known as "chirp," is especially advantageous in that, in addition to determining the range to a target, the relative doppler can be obtained simultaneously with resolution equivalent to that of long-pulse radar systems.

FM "chirped" laser radar which involves heterodyne or coherent detection has proven to be particularly useful in these applications. Typically in these systems, a continuous wave (CW) transmitter emits laser light at a preselected center frequency. This emitted light is frequency modulated into linear "chirps" by passing it through an electro-optical device disposed within the cavity of the transmitter. The frequency variation created is preferably linear, and the frequency-versus-time characteristic of the signal typically has a trapezoid pattern.

The "chirped" signal is directed toward a target and then reflected back therefrom, creating a "return" signal associated with that target. The time taken by the transmitted signal to reach its target and then return causes the return signal to be displaced in time with respect to the transmitted signal.

The instantaneous frequency difference between the transmit and return signals may be obtained by comparing the return signal to a reference signal, which is typically a sample of the transmitted signal created by retaining a portion of the transmitted beam using a beam splitter. Properly scaled, this instantaneous frequency difference can be used to, in effect, demodulate the return signal in order to obtain information about the target.

As noted above, FM laser radar utilizes an electro-optical device, typically an EO (electro-optic) crystal to modulate the frequency of the laser transmitter. The EO crystal is driven by a high-voltage driver, and the shift in frequency imparted by modulation is proportional to the electric field across the crystal. Linear FM pulse compression radar requires the frequency modulation to be linear to much less than 1%, which, in turn, requires a voltage ramp across the EO crystal that is linear to less than 1%.

The bandwidth of the high-voltage driver, i.e., the driver's ability to respond quickly, is also proportional to the overall linearity achievable. For a trapezoidal frequency modulation waveform, the bandwidth requirement can exceed ten times the pulse repetition frequency "PRF" in order to achieve 1% linearities.

For some applications, the linearity requirements are much stricter. To meet such strict requirements, the outgoing linear FM pulse must be monitored for linearity, and an error signal must be generated which can be used to make fine corrections to the EO crystal voltage ramp. To permit fine corrections to be made, the high-voltage driver must be able to respond within a small fraction of the total trapezoidal pulse width. In such case, the driver bandwidth must be on the order of a hundred times the PRF.

Previously-known high-voltage drivers have required their high-voltage components to operate in their linear regions as part of a control loop. Therefore, in terms of bandwidth, the performance-limiting components usually are the high-voltage elements and/or the step-up transformer used to increase the output voltage of the high-voltage driver. In a typical configuration, the control loop bandwidth of the high-voltage driver (amplifier) is typically less than 10% of the lowest speed component in order to meet loop stability requirements. Therefore, the time constant or speed at which linearity corrections can be made is 100 times less than the lowest speed component.

SUMMARY OF THE INVENTION

It is therefore an object of the invention to provide a driver circuit for an EO crystal which has a wider bandwidth than previously-known drivers;

It is another object to provide such a driver circuit which can respond to fine correction signals;

It is yet another object to provide a high-voltage driver which can respond to fine correction signals within a small fraction of pulse width; and It is still another object to provide such a driver circuit in which linearity corrections can be made faster than previously-known applications.

These and other objects and advantages are achieved by employing a voltage ramp integrator which utilizes the capacitance of the EO crystal to integrate the current produced by a high-voltage constant current source. According to a further aspect of the invention, a means of driving an EO crystal with a high-voltage ramp is provided, including a means for inserting a modulation correction voltage for addition or subtraction from the ramp. The correction voltage is integrated within the driver and allows for very high-speed closed-loop modulation control.

Circuits configured according to the invention can achieve bandwidths much greater than the conventional types of high-voltage drivers as well as achieving high linearity performance. The speed at which linearity corrections can be made approaches 10% of the bandwidth of the lowest speed component. Therefore, this invention is theoretically ten times faster than prior approaches. In addition, the parts count is much less, and the driver is much easier to stabilize.

This invention can make use of vacuum tube or solid state technology, and can achieve much higher voltage and control bandwidths. It further makes high-voltage, high-bandwidth, high-linearity crystal drivers producible and simple.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

FIG. 1 is a schematic block circuit diagram illustrating application of the preferred embodiment;

FIG. 2 is a circuit diagram of the preferred embodiment; and

FIG. 3 is a waveform diagram useful in illustrating operation of the preferred embodiment.

DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a readily implementable and particularly useful embodiment of the invention.

The block diagram shown in FIG. 1 demonstrates an application of the preferred embodiment. In this application, a high-voltage EO crystal ramp generator and integrator 11 are part of a larger control loop 13. A transmit laser 15 produces a linear FM pulse output 17. A portion 12 of this output 17 is split off by a beam splitter 22 and detected by a heterodyne optical detector or photomixer 19, which is also supplied with a local oscillator laser 14.

The photomixer 19 outputs an electrical signal on line 18 that is centered at a frequency equal to the difference in operating frequencies of the local oscillator (LO) laser 14 and the transmit laser 17. The electrical signal is a sine wave that has frequency modulation. The difference frequency is fixed and is determined by specific system design criteria. The frequency modulated signal on line 18 feeds the phase linearity measuring circuit 20, producing an error signal e(t).

The error signal or voltage e(t) on line 21 is proportional to the frequency modulation error. The "error" is simply unwanted deviation from a perfectly modulated sine wave. This error signal e(t) is used to make fine corrections in the output of the EO crystal driver 11.

FIG. 2 shows an embodiment of the EO crystal driver 11. The driver 11 in this particular embodiment includes a high-voltage vacuum tube or "power beam tube" $T_1$. A first resistor $R_1$ has a first terminal connected to ground and a second terminal connected to the first terminal of a second resistor $R_2$. The second terminal of the resistor $R_2$ is connected to a negative voltage source $-V$. The grid of the power beam tube $T_1$ is connected to the junction of the first and second resistors $R_1$, $R_2$. Another resistor $R_k$ has its first terminal connected to the negative voltage source $-V$ and a second terminal connected to the cathode of the power beam tube $T_1$.

A filament transformer 31 is used to heat the filament of tube $T_1$ so that the tube $T_1$ will produce electrons. The anode of the power beam tube $T_1$ is connected to one terminal of a MOSFET switch 35 and to the first of two terminals of the EO crystal 16. The MOSFET switch 35 is connected across the EO crystal 16.

The fine adjustment signal e(t) from the phase linearity measurement circuit 20 is fed to an amplifier 33 and then through an isolating capacitor $C_1$ to the grid of the power beam tube $T_1$. The current level provided to the EO crystal 16 from the constant current source driver circuit 11 is 50 milliamps, whereas the fine adjustment signal from the control loop, which is added or subtracted from the 50 milliamps, can be as high as 5 milliamps or a 10% adjustment level. The level of the voltage $-V$ is approximately 3,000 volts.

The operation of the circuit of FIG. 2 is as follows: A constant current generator is formed by the high-voltage vacuum tube, i.e. "power beam tube $T_1$," and the voltage across resistor $R_k$. The voltage across $R_k$ is determined by the bias network of resistors $R_1$ and $R_2$.

The circuitry of FIG. 2 produces a coarse but linear voltage ramp 41 across the EO crystal 16 as shown in FIG. 3. The voltage ramp 41 is generated by the integration of the current from the constant current source by the capacitance of the crystal 16. As long as the current from the constant current source and the crystal capacitance are constant, the voltage ramp 41 is linear. Fine adjustments of the voltage ramp are provided by the error signal e(t) from the phase linearity measurement circuit 20. After the ramp 41 has reached its maximum voltage $(-V)$, the voltage across the crystal 16 is reset or discharged to zero volts through the MOSFET switch 35.

It may be observed that the capacitance of crystal 16 forms a loop integrator. From experience, it is very hard to make a wide-band (100-mHz) loop integrator from an active element such as an op amp. Since the preferred embodiment avoids use of an active element to form the loop integrator, it avoids the accompanying bandwidth restrictions.

Typical amplifiers or drivers operate in a closed-loop circuit. The bandwidth of the driver is equal to the closed-loop speed in such case. As noted at the outset, the frequency modulation loop in a typical FM laser radar must operate ~10 times slower than the slowest component within the loop. Previous techniques used EO driver amplifier circuity which effectively was part of the control loop and which was made from a feedback circuit. The amplifier bandwidth was ten times less than the components that make it up. The frequency modulation loop was then ~10 times slower than the amplifier's speed.

It will be appreciated from the foregoing that the preferred embodiment essentially "cuts out the middleman," i.e. eliminates the impact of the EO driver circuitry on the frequency modulator loop speed. This is done by operating the amplifier or driver open loop within the frequency modulation control loop, rather than in a closed-loop circuit as in related art. In this fashion, the frequency modulation loop speed is about ten times faster than in previously-known circuits.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. Apparatus for driving an EO crystal in a laser radar system, said crystal having an output and a predetermined capacitance, said apparatus comprising:
   means for supplying a constant current to said crystal for integration by the capacitance of the crystal to produce a voltage signal across said capacitance comprising a linear ramp voltage occurring over a selected time interval; and
   means responsive to the output of said EO crystal for applying a correction current to said constant current to provide fine correction to said linear ramp voltage.

2. The driver circuit of claim 1, wherein said means for supplying a constant current comprises:
   current source means; and
   means for causing the current produced by said current source means to be a constant selected value.

3. The driver circuit of claim 2, wherein said current source means comprises a power beam tube.

4. The driver circuit of claim 3, wherein said means for causing said current source means to be a selected value comprises a biasing network connected to said power beam tube.

5. The driver circuit of claim 3, wherein said power beam tube has an output terminal connected to said EO crystal.

6. The driver circuit of claim 1 further comprising means for discharging said ramp voltage.

7. Frequency modulation apparatus for an FM laser radar comprising:
   an electro-optical crystal having a capacitance;
   means for applying a constant current to said crystal for integration by the capacitance of said crystal to generate a linear ramp voltage waveform across said crystal; and
   means for adding a correction current to said constant current, said correction current being representative of frequency modulation error to provide fine correction to said linear ramp voltage.

8. The apparatus of claim 7, further including means for adding a correction current to said constant current, said correction current being representative of frequency modulation error.

9. The apparatus of claim 7, wherein said means for supplying a constant current comprises:
   current source means; and
   means for causing the current produced by said current source means to be a constant selected value.

10. The apparatus of claim 9, wherein said current source means comprises a power beam tube.

11. The apparatus of claim 9, wherein said means for causing said current source means to be a selected value comprises a biasing network connected to said power beam tube.

12. The apparatus of claim 10, wherein said power beam tube has an output terminal connected to said EO crystal.

13. The apparatus of claim 7 further comprising means for discharging said ramp voltage.

* * * * *